United States Patent
Watanabe et al.

(10) Patent No.: US 7,192,071 B2
(45) Date of Patent: Mar. 20, 2007

(54) BULKHEAD FOR RAISING STRENGTH AND RIGIDITY OF VEHICULAR FRAME MEMBERS

(75) Inventors: Daisuke Watanabe, Soja (JP); Toru Inoue, Soja (JP)

(73) Assignee: Asteer Co., Ltd., Okayama (JP)

( * ) Notice: Subject to any disclaimer, the term of this patent is extended or adjusted under 35 U.S.C. 154(b) by 0 days.

(21) Appl. No.: 11/257,372

(22) Filed: Oct. 24, 2005

(65) Prior Publication Data

US 2006/0097533 A1    May 11, 2006

(30) Foreign Application Priority Data

Nov. 8, 2004    (JP)    ............................. 2004-323118

(51) Int. Cl.
    *B62D 27/00*    (2006.01)
(52) U.S. Cl. ..................... 296/30; 296/204; 296/187.02
(58) Field of Classification Search .................. 296/30, 296/204, 187.02
    See application file for complete search history.

(56) References Cited

U.S. PATENT DOCUMENTS

| | | | | |
|---|---|---|---|---|
| 4,848,835 A | * | 7/1989 | DeRees ....................... | 296/204 |
| 5,027,570 A | * | 7/1991 | Mitchell et al. ........ | 296/203.03 |
| 6,053,564 A | * | 4/2000 | Kamata et al. ................ | 296/30 |
| 6,299,240 B1 | * | 10/2001 | Schroeder et al. ........... | 296/204 |
| 6,402,414 B1 | * | 6/2002 | Kanodia et al. ............... | 296/30 |
| 6,471,285 B1 | * | 10/2002 | Czaplicki et al. ....... | 296/187.02 |
| 6,896,320 B2 | * | 5/2005 | Kropfeld ................ | 296/203.01 |
| 6,921,130 B2 | * | 7/2005 | Barz et al. ............. | 296/187.03 |
| 6,932,421 B2 | * | 8/2005 | Barz ...................... | 296/187.02 |
| 7,077,461 B2 | * | 7/2006 | Ratet ..................... | 296/187.02 |
| 7,125,461 B2 | * | 10/2006 | Czaplicki et al. ............. | 156/79 |
| 2004/0145217 A1 | * | 7/2004 | Hanyu ........................ | 296/204 |

FOREIGN PATENT DOCUMENTS

| | | |
|---|---|---|
| JP | 08-040303 | 2/1996 |
| JP | 10-059218 | 3/1998 |
| JP | 11-078978 | 3/1999 |
| JP | 3051546 | 6/2000 |
| JP | 2004-306777 | 11/2004 |

* cited by examiner

*Primary Examiner*—Kiran B. Patel
(74) *Attorney, Agent, or Firm*—Koda & Androlia

(57) ABSTRACT

The invention relates to a bulkhead that can realize not only manufacture as lightweight and inexpensive as possible but also less the waste produced from material, while keeping sufficient structural strength and rigidity thereof. The bulkhead 1 for raising strength and rigidity of a vehicular frame member 2 comprises: a partition face 11 having an outer shape contoured to a sectional shape of the vehicular frame member 2; connecting wings 12, 13, 13 projected and folded at individual sides of the partition face 11 except an open edge 111, and forming a peripheral wall section 16 having a C-shape by linking vicinities of folded edges 121, 131, 131; and a bead 14 formed on the partition face 11 near the open edge 111 in that it is denting in same direction of the folded connecting wings 12, 13, 13, and extending in parallel to the open edge 111.

3 Claims, 6 Drawing Sheets

BULKHEAD FOR RAISING STRENGTH AND RIGIDITY OF VEHICULAR FRAME MEMBERS

TECHNICAL FIELD

The present invention relates to a bulkhead for reinforcing a vehicular frame member such as a side member, a cross member, a side sill or a pillar.

BACKGROUND OF THE INVENTION

The vehicular frame member such as the side member, the cross member, the side sill or the pillar of an automobile is constructed as a hollow member by assembling a main part having a channel-shaped section and an auxiliary part for closing the open face of the main part. Here, the "side faces" and the "bottom face" of the main part are named for the case, in which the open face corresponds to the upper face, for conveniences of description. For example, in case the vehicular frame member is directionally changed to face the "bottom face" sideways, the open face opposed to the "bottom face" is also directed sideways so that one of the "side faces" becomes the upper face whereas the other becomes the bottom face.

The main part of the vehicular frame member is demanded to have a high structural strength and rigidity on one hand, and lightweight and inexpensive as an automotive member on the other hand. For the latter demand, a thin metal sheet (or a steel sheet) is ordinarily used for producing the main part. This is because the main part may be deformed in its sectional shape, when it is subjected to an external force such as tension, compression or twist, and may be lowered in the structural strength and rigidity. For this apprehension, a necessary number of bulkheads are mounted for the reinforcement in the necessary portions in the main part thereby to suppress or prevent the reduction in the structural strength and rigidity. This reinforcement makes compatible high strength and lightweight, as demanded for the vehicular frame member.

The bulkhead in the prior arts is constructed, as disclosed in JP-A-2004-306777, for example, such that connecting wings individually projected over the three sides of a partition face having a shape contoured to the sectional shape of the main part are individually folded at the sides, formed as the folded edges, of the partition face. This bulkhead is fixed to the main part by welding the individual connecting wings to the both side faces and the bottom face of the main part while separating the compartments of the main part in the extending direction.

The bulkhead is demanded to have such a high structural strength and rigidity as can reinforce the vehicular frame member. This demand is a problem how to suppress or prevent the buckling, bending or deformation of the partition face or the folded edges. In this case, it can be exemplified to provide a bulkhead having a peripheral wall section formed by jointing vicinities of the folded edges of the three connecting wings and an auxiliary flange plate which is folded at a folded edge formed at such a side of the partition face as lacks the connecting wing. As a result, existence of the peripheral wall section enclosing the partition face enhances the modulus of section of the partition face to prevent from buckling, bending or deformation of the partition face, and thereby to raise the structural strength and rigidity as the bulkhead.

The bulkhead disclosed in JP-A-11-078978 adopts the structure, in which not only the three connecting wings connected to the individual side faces and the bottom face of the main part, as described above, but also one connecting wing projected over the remaining side of the partition face is folded oppositely of those three connecting wings. The connecting wing thus folded backward is welded to the main part with its two ends contacting with the flanges which are formed across the open face of the main part. This bulkhead is enabled, by the connecting wings alternately folded, to raise the modulus of section of the partition face near the open face of the main part, thereby to suppress or prevent buckling, bending or deformation of the partition face and to raise the structural strength and rigidity as the bulkhead.

SUMMARY OF THE INVENTION

The bulkhead is demanded to have a high structural strength and rigidity on one hand, because it has an object to reinforce the vehicular frame member, and to have lightweight and inexpensiveness as an automotive member on the other hand. In this respect, the bulkhead disclosed in JP-A-11-078978 is additionally provided with the connecting wing to be welded over the flange of the main part, and this connecting wing is larger than the remaining connecting wings to be jointed to the side faces or the bottom face of the main part. This causes a problem that the bulkhead is brought the increase in weight and thereby costs higher. Since a plurality of the bulkhead is used, it is desirable to avoid the increase in weight either the cost for a single bulkhead.

As compared with the bulkhead disclosed in JP-A-11-078978, the bulkhead having a simple structure with the peripheral wall section enclosing the partition face is capable of obtaining high structural strength and rigidity together with lightweight thereof. However, a position gap between the bulkhead and the feeding portion which is a part having a hole to be fitted with a feeding protrusion for feeding a sheet material or so called a carrier forward intermittently occurs in orthogonal direction to the feeding direction of the original plate or the bulkhead, where the peripheral wall section is formed by the pressing work. In order to absorb such position gap, therefore, it is necessary to provide with an extension part, or a pantagraph, which become a waste portion as the product, on the sheet material (as referred to FIG. 5).

As a result, there is a problem that a relatively large amount of the waste portion including the aforementioned extension portion is simultaneously produced from the original material. On the other hand, the extension portion is to connect the feeding portion and the peripheral wall section formed at a particular side of the partition face having no connecting wing. The peripheral wall section and the feeding portion are separated so that the peripheral edge portion of the metal mold corresponding to the peripheral wall section of the bulkhead extending the extension portion therefrom also performs as one cutting edge of the cutter. In case, however, the peripheral edge of the metal mold also performs as the cutting edge while avoiding from producing waste of the material as possible, thickness of the peripheral edge of the metal mold as the cutting edge becomes thinner. This causes a partial loss of the peripheral edge of the metal mold when the bulkhead and the feeding portion are separated (as referred to FIG. 6). Therefore, the inventors have made investigations to develop a bulkhead having not only sufficient structural strength and rigidity, lighter weight, lower cost in manufacture, but also construction realizing reduction of waste of the materials and reduction of burden to the metal mold.

As a result of the investigations, the inventor has developed a bulkhead for raising strength and rigidity of vehicular frame members, which is an upright partition separating compartments of the vehicular frame member having a channel-shaped section, comprising: a partition face having an outer shape contoured to the sectional shape of the vehicular frame member; a plurality of connecting wings projected integrally from individual sides of the partition face except one specific side (hereinafter be referred to as an open edge) and then folded at the corresponding individual in the same direction, including a peripheral wall section having a C-shape formed by linking vicinities of the folded edges that are adjacent to each other; and a bead formed on the partition face near the open edge in that it is denting in the same direction of the connecting wings that are folded, and extending in parallel to the open edge through the opposed folded edges of the connecting wings. The individual connecting wings corresponding to the side faces of the main part of the vehicular frame member are fixed by inscribing and then welding them with the individual side faces of the main part.

In the bulkhead of the invention, the bead, which is dented in the folded direction of the connecting wings and extending in parallel with the open edge between the opposed connecting wings, is formed on the partition face near the open edge, thereby to suppress or prevent the buckling, bending or deformation of the partition face or the folded edges. Specifically, the bead at first increases the modulus of section of the partition face to raise rigidity of the partition face thereby to suppress or prevent the buckling, bending or deformation of the partition face. Moreover, the bead extends between the opposed connecting wings to dent the edges of the individual connecting wings thereby to enhance the modulus of section of the edge. As a result, the higher rigidity of the partition face itself is further raised to suppress or prevent the buckling, bending or deformation of the edge. Moreover, the bead directly reinforces the vehicular frame member by performing also as a tension element extending between the opposed side faces of the main part of the vehicular frame member. The sectional shape of the aforementioned bead is arbitrary but is preferred to have such a semicircular sectional shape as can be easily formed by a press working.

Further, the bulkhead in the prior art demands the extension portion for absorbing the physical positional displacement, which is occurred during the press working, of the bulkhead from the feeding portion. On the contrary, the bulkhead of the invention needs no absorption of the physical positional displacement of the bulkhead from the feeding portion, because the bead can be formed utilizing by ductility of the partition face. Therefore, in the present invention, it is effective sufficiently for adopting a simple connecting portion having no such extension portion disclosed in the prior art to connect the bulkhead and the feeding portion. Moreover, the bead causes not to construct thickness of a part of the metal mold at least thinner to thereby avoiding the metal mold from becoming brittle, since the bead is not the side itself of the partition face but is formed as a ridge on the inner side of the partition face in the same direction as the folded direction of the connecting wing. Especially in the metal mold of the prior art, the portion of the cutting edge is positioned at the upper edge of the peripheral wall section of the metal mold so that it rises to thin the metal mold partially. In the metal mold for shaping the bulkhead of the invention, on the contrary, no peripheral wall section exists between the open edge or the specific side of the partition face and the connecting portion so that the connecting portion is flatly connected with the open edge of the partition face without any steps. As a result, the cutting edge portion of the metal mold can be disposed at the same height as that of the partition face so that it is not necessary to form a thin and uprising cutting edge portion of the metal mold corresponding to the peripheral wall section of the bulkhead. Thus, according to the present invention, the sufficient strength of the metal mold can also be accomplished.

Moreover, in order to draw a higher performance out from the bead as being the tension element constructed between the side faces of the main part of the vehicular frame member, the bead is desirably disposed linearly extending in orthogonal direction to the opposed two connecting wings. Moreover, it is the open edge of the partition face as the edge of the side having no connecting wing that improvement of rigidity is the most required. Therefore, the bead may be formed near the open edge.

Next, the connecting wings fix the position of the partition face with respect to the main part of the vehicular frame member to restrict the mutual positional relationship between the main part and the partition face, thereby suppressing or preventing inflection of the partition face. As a result, it may structure the connecting wings in the invention in that the connecting wings projected integrally from remaining sides except the open edge of the partition face are folded in the same direction at the folded edges as individual sides of the partition face. In addition, the connecting wings in the invention may provide the peripheral wall section that is formed by linking vicinities of the edges of all the connecting wings. The bulkhead in the prior art has the peripheral wall section in a shape of the closed ring enclosing the partition face. On the contrary, the invention provides the bulkhead comprising the bead that can raise rigidity of the partition face around the open edge is formed, and thereby to allow in use the peripheral wall section having a C-shape formed by the connecting wings.

The bulkhead of the invention has such an effect that it can be manufactured lightweight and inexpensive with less waste of the material while realizing sufficient structural strength and rigidity. At first, the sufficient structural strength and rigidity is given by the effect which is directly brought by the bead crossing the partition face in the sectional shape denting the individual folded edges of the opposed connecting wings. The bead not only raises the structural strength and rigidity of the partition face and the individual folded edges but also reinforces the main part of the vehicular frame member directly. Next, as to manufacturing of the bulkhead lightweight and inexpensive with less waste of the material, it is an effect obtained by eliminating the connecting wing positioned at the open edge of the partition face together with elimination of the extension portion. In addition, elimination of the peripheral wall section corresponding to the location of the open edge can also effect to manufacture the bulkhead in lighter weight and lower cost. Thus, the invention provides the bulkhead that can meet demands for being as a bulkhead.

DETAILED DESCRIPTION OF THE INVENTION

Figure 1:
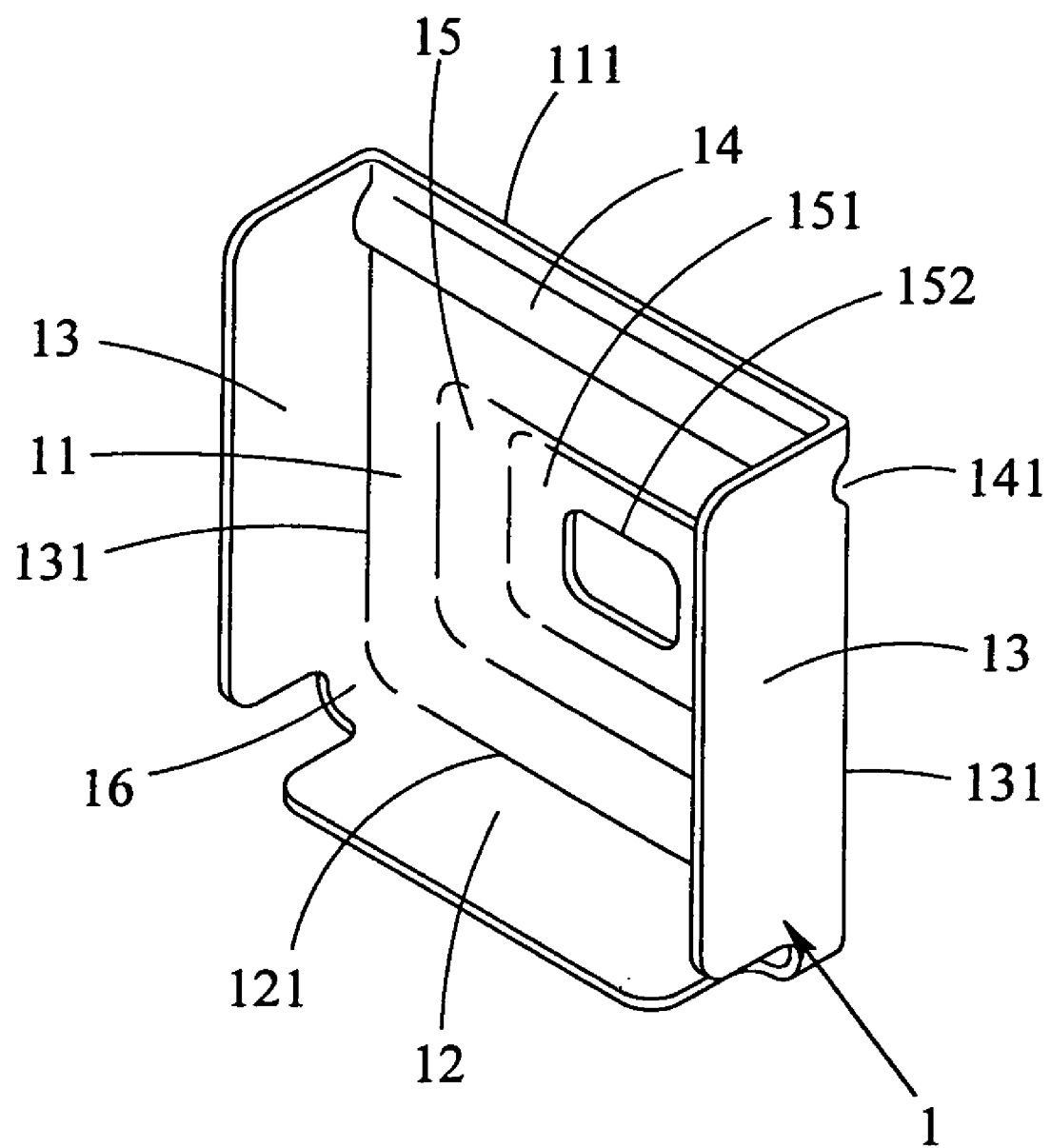
FIG. 1 is a perspective view showing one embodiment of a bulkhead according to the invention.
Figure 2:
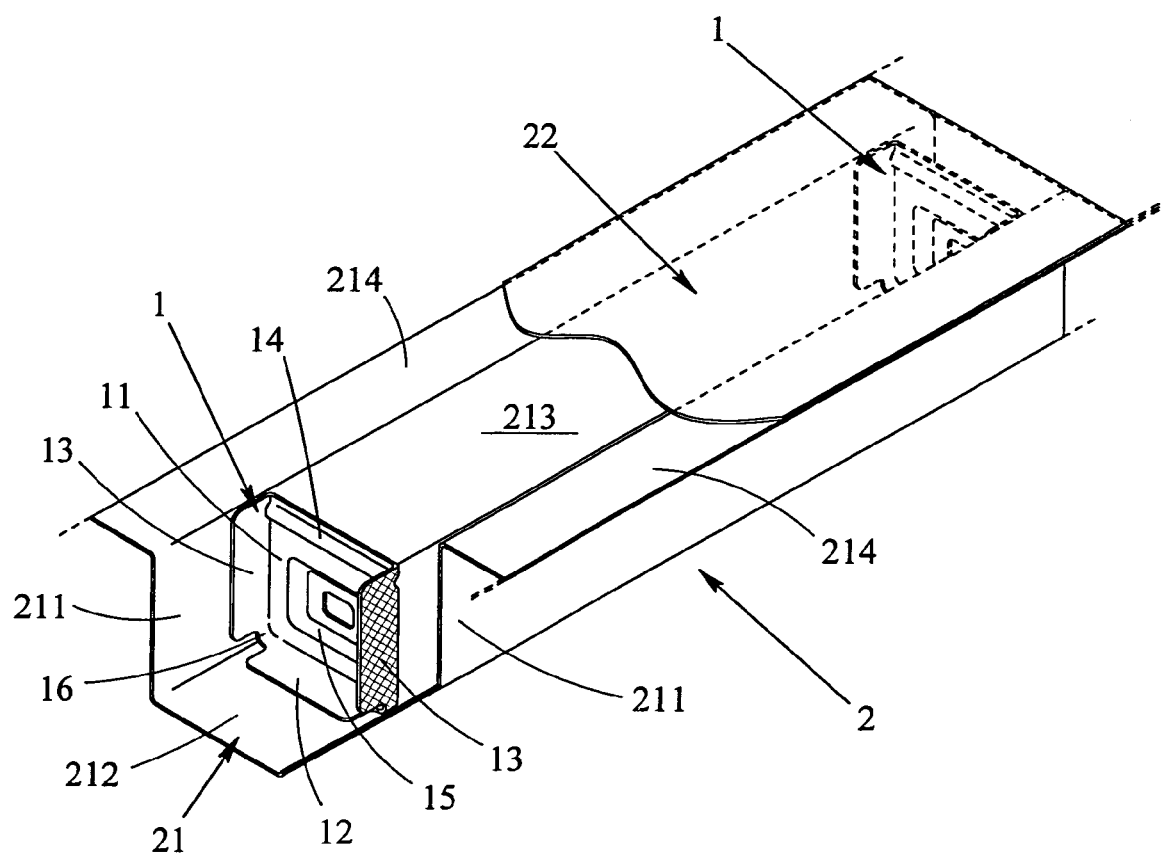
FIG. 2 is a partially broken perspective view of a vehicular frame member having a main part, embodying the bulkhead according to the invention.
Figure 3:
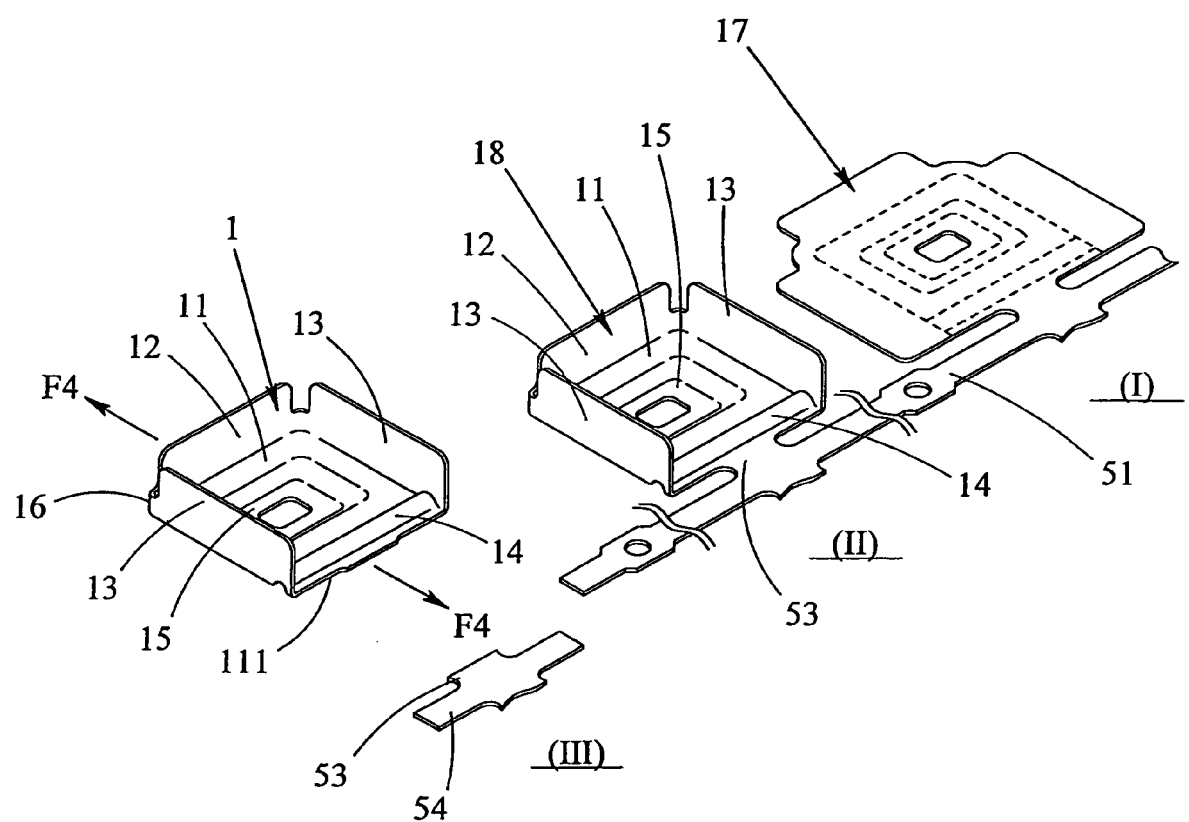
FIG. 3 is a perspective view showing a process layout expressing a procedure for manufacturing the bulkhead of the invention.
Figure 4:
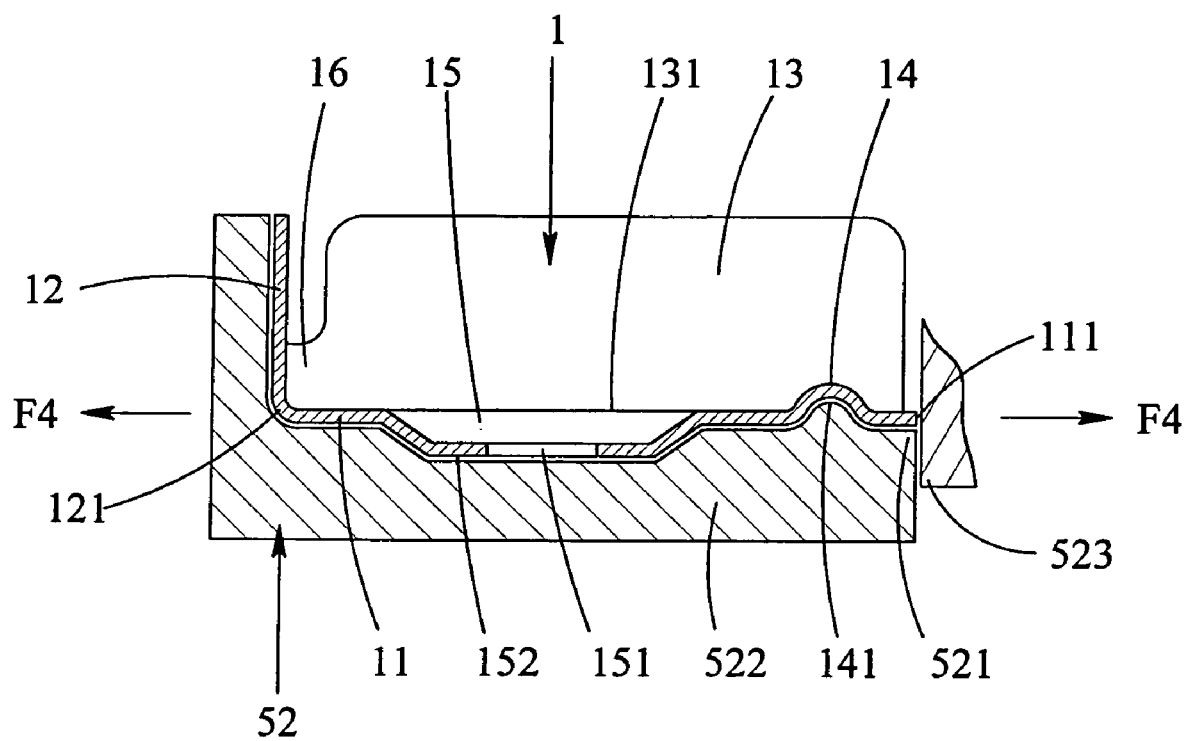
FIG. 4 is a cross-sectional view taken along the line F4—F4 of FIG. 3 and shows the process of separating the bulkhead from a feeding portion (or a carrier)
Figure 5:
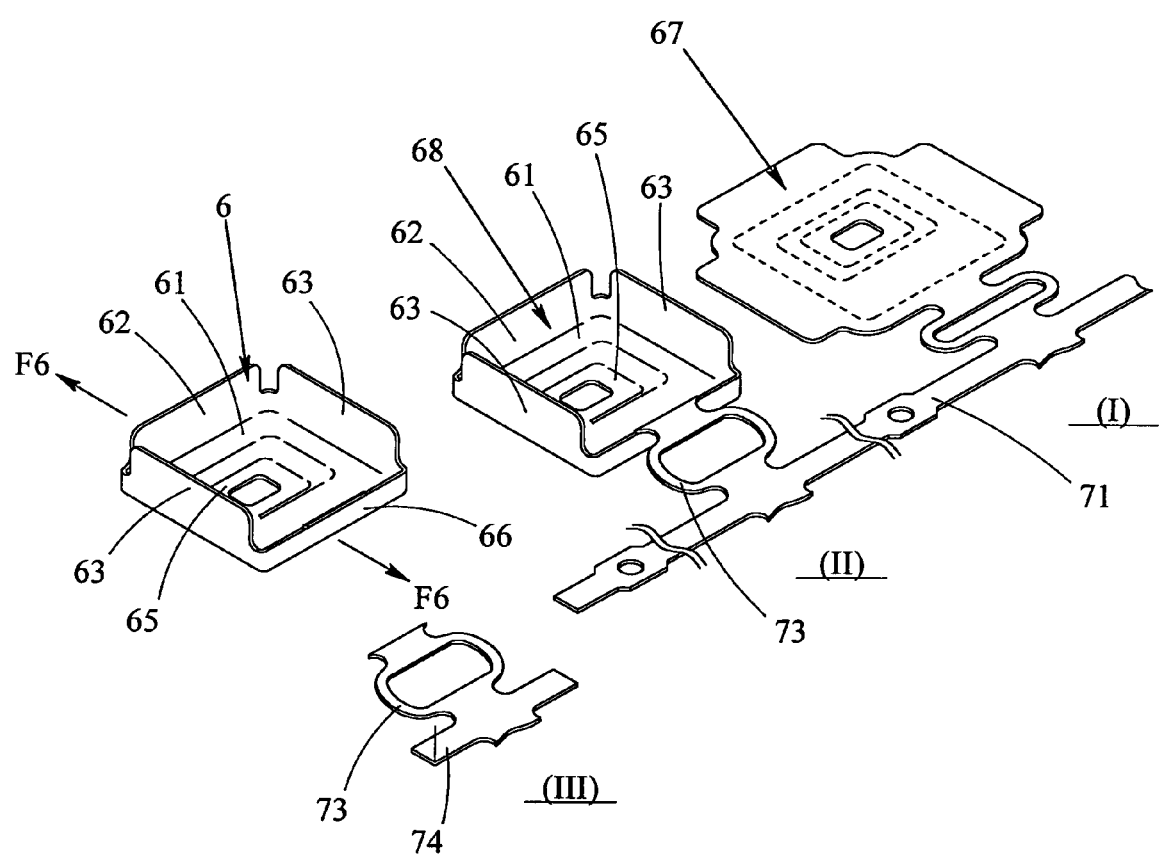
FIG. 5 is a perspective view corresponding to FIG. 3, showing a process layout expressing a procedure for manufacturing a bulkhead of the prior art.
Figure 6:
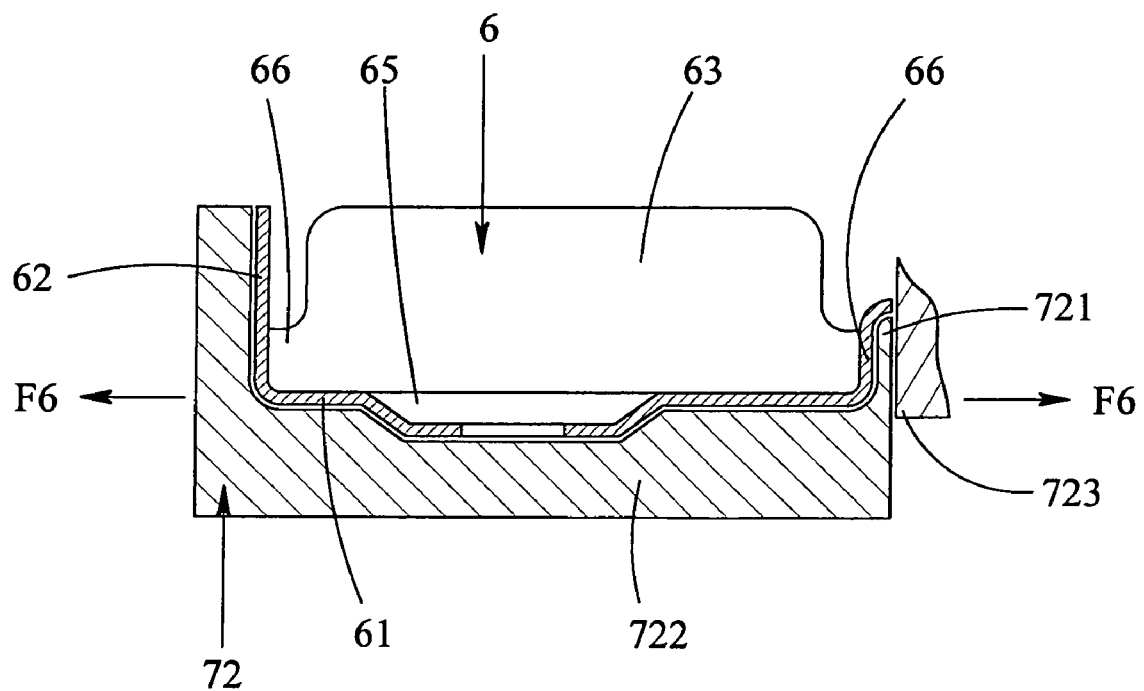
FIG. 6 is a cross-sectional view taken along the line F6—F6 of FIG. 5 but shows the process of separating the bulkhead from an extension portion (or a pantagraph).

An embodiment of the invention will be described with reference to the accompanying drawings. FIG. 1 is a perspective view showing one embodiment of a bulkhead 1 according to the invention; FIG. 2 is a partially broken perspective view of a vehicular frame member 2 having a main part 21, embodying the bulkhead 1 according to the invention; FIG. 3 is a perspective view showing a process layout expressing a procedure for manufacturing the bulkhead 1 of the invention; FIG. 4 is a cross-sectional view of the bulkhead 1 and a lower mold 52 and shows the process of separating the bulkhead 1 from a feeding portion (or a carrier) 51; FIG. 5 is a perspective view corresponding to FIG. 3, showing a process layout expressing a procedure for manufacturing a bulkhead 6 of the prior art; and FIG. 6 is a cross-sectional view corresponding to FIG. 4 for the bulkhead 6 and a lower part 72, showing the process of separating the bulkhead 6 from an extension portion (or a pantagraph) 73. For conveniences of explanation, the individual process layouts illustrated in FIG. 3 and FIG. 5 show only the main processes (I), (II), (III) but omit the others, so that the pressing process (II) is expressed together as collected a plurality of pressing processes.

As shown in FIG. 1, the bulkhead 1 of this embodiment is provided with three sheets of connecting wings 12, 13, 13, which are integrally extending and folded from the three sides of a partition face 11 having a substantially square shape in a top plan view. The bulkhead 1 is further provided with a line of the bead 14 linking the paired opposed connecting wings 13, 13. The connecting wings 12, 13, 13 and the bead 14 are integrally formed on the partition face 11 by press molding of a raw sheet (or a steel sheet) having a thickness of 1.2 mm to 1.6 mm. This bulkhead 1 is fixed to the interior of the main part 21 of the vehicular frame member 2, as shown in FIG. 2, by spot-welding the individual connecting wings 12, 13, 13 in the two side faces 211 and 211 and the bottom face 212 of the main part 21. The main part 21 of this embodiment has an open face 213 opposed to the bottom face 212. The vehicular frame member 2 is constructed, after the bulkhead 1 was fixed, by fixing an auxiliary part 22 over flanges 214, 214 across the open face 213 thereby to close the open face 213.

The main part 21 of the vehicular frame member has a channel-shaped section composed of the two side faces 211, 211 and the bottom face 212 both having substantially flat shape, and the open face 213 opposed to the bottom face 212. The partition face 11 has a configuration contoured to the sectional shape of the main part 21, i.e., a configuration of a substantially square shape in a top plan view. The partition face 11 in this embodiment further comprises a swelling bed part 15 that is formed by swelling the central area surrounded by the bead 14 and the remaining three sides of the partition face toward the opposite direction of that of the folded connecting wings 12, 13, 13. Furthermore, a through hole 151 is formed in a flat bottom face 152 of the aforementioned swelling bed part 15. This swelling bed part 15 is formed within a range of an area of 50% to 60% of the partition face 11 into a trapezoidal section having a depth of about from 3 mm to 5 mm, and thereby can raise the rigidity of the partition face 11. Moreover, the through hole 151 is formed by cutting off the flat bottom face 152 of the swelling bed part 15 in leaving the peripheral edge thereof. This through hole 151 has advantages in that not only the weight of the partition face 1 can be reduced but also the paint being poured to interior of the main part 21 mounting the partition face 11 can be spread out spotlessly while draining surplus paint.

Three connecting wings 12, 13, 13 in this embodiment are projected integrally from three sides of the partition face 11 as individually correspond to the bottom face 212 and the two opposed side faces 211, 211 of the main part 21, and are folded to form the folded edges 121, 131, 131 having an arc shaped cross-section near the three sides on the partition face 11. The radius of curvature of the folded edges 121, 131, 131 is not restricted but is preferably to be as small as possible from the standpoint of suppressing or preventing the buckling, bending or deformation of the folded edges 121, 131, 131. Thus, the folded edges 121, 131, 131 may have a radius of curvature in a range of 3 mm to 4 mm. In this embodiment, vicinities of the adjoining folded edges 121, 131, 131 of all the connecting wings 12, 13, 13 on the partition face 11 are linking to each other to form a peripheral wall section 16. This peripheral wall section 16 is formed into a C-shaped circular wall lacked a specific part corresponding to one side of the partition face 11 which is defined as an open edge 111, thereby to raise rigidity of the partition face 11.

The bead 14 in this embodiment is formed linearly by linking dents 141 having a semicircular sectional shape as referred to FIG. 4, which are individually formed at the folded edges 131, 131 of the paired connecting wings 13, 13 to be fixed in the two side faces 211, 211 of the main part 21. Specifically, the bead 14 is dented in the folded direction of the connecting wings 12, 13, 13 and extends between the opposed connecting wings 13, 13 and in parallel with the open edge 111 having neither the connecting wings 13, 13 and the peripheral wall section 16. This bead 14 is not restricted in sectional shape or in what it sizes. Regarding to process of the press molding, however, it is preferable that a diameter of the semicircular sectional shape of the bead 14 has been set up about 6 mm to 10 mm. The bead 14 can perform to suppress or prevent from buckling, bending or deformation of the folded edges 131, 131 directly by denting the folded edges 131, 131. In this embodiment, moreover, the position of the bead 14 formed on the partition face 11 is located along the vicinity of the open edge 111. Thus, it can be performed that the position of the bead 14 prevents or suppresses from buckling, bending or deformation of the partition face 11, which might be caused by the open edge 111 formed without a corresponding connecting wing.

Moreover, the bead 14 in this embodiment is extending orthogonally to the paired opposed connecting wings 13, 13 individually. As a result, when the bulkhead 1 is fixed in the main part 21, the bead 14 performs as a tension element constructing between the side faces 211, 211 of the main part 21 so that it reinforces the main part 21 directly. In this case, rigidity or structural strength of the bead 14 itself is fallen when the skirt of the bead 14 becomes the open edge 111. Therefore, the bead 14 may be formed on the inner side of the open edge 111, i.e., in the partition face 11. It is preferable that the distance between the skirt of the bead 14 and the open edge 111 in this case is more than 3 mm at the least. In the case of this embodiment, moreover, the bead 14 is formed along the open edge 111 of the bulkhead 1 so that it can reinforce such upper edges of the side faces 211, 211 of the main part 21 as might otherwise lowered in the structural strength. This reinforcement of the bulkhead 1 by the bead 14 and the reinforcement of the main part 21 are the structural effects of the present invention.

The bulkhead 1 of the invention is manufactured by the following procedure. First, at a pressing process (I), as shown in FIG. 3, a raw sheet (although omitted from FIG. 3) being fed is punched into a predetermined shape to form developed bulkheads 17 connected to the both sides of the feeding portion (or a carrier) 51 across a joint portion 53 (although the developed bulkhead 17 on this side is omitted from FIG. 3 for conveniences of the explanation). Conventionally, as shown in FIG. 5, it is necessary to form the large extension portion (or the pantagraph) 73 for absorbing the positional displacement of the bulkhead 6 with respect to a feeding portion 71. In the process of manufacturing the bulkhead 1 in the present invention, on the contrary, it becomes sufficient to use a narrower raw sheet since the extension portion can be dispensed. Furthermore, it is also found to succeed limitation of wastes of the sheet since the clearances between the developed bulkheads 17 and the feeding portion 51 becomes narrower.

The developed bulkhead 17 is pressed by a pressing process (II), as shown in FIG. 3 and FIG. 4, according to the lower mold 52 (although only a cutting edge 523 is shown as the upper mold in FIG. 4) of the metal mold, to form the swelling bed part 15, the peripheral wall section 16 having a C-shape, the connecting wings 12, 13, 13 and the bead 14 in the partition face 11 thereby to provide a bulkhead 18 for a semi-finished product. At this stage, the semi-finished bulkhead 18 is jointing to the feeding portion 51 through the joint portion 53. Thus, in the present invention, since the bead 14 is formed on the partition face 11 at a location which is inside from the open edge 111, the open edge 111 jointed to the joint portion 53 and the feeding portion 51 are substantially coplanar, thereby to avoid positional displacement occurred between the semi-finished bulkhead 18 and the feed portion 51.

In the prior art, as shown in FIG. 5 and FIG. 6 as well, the developed bulkhead 67 is pressed by a pressing process (II), according to the lower mold 72 (although only a cutting edge 723 is shown as the upper mold in FIG. 6) of the metal mold, to form a recess 65, the peripheral wall section 66 having a closed ring shape and the connecting wings 62, 63, 63 in a partition face 61 thereby to provide a bulkhead 68 for a semi-finished product. In this bulkhead 68, the extension portion 73 is jointed to a portion, which is substitute to the bead, of the peripheral wall section 66 having a closed ring shape. As shown in FIG. 6, the positional displacement between the bulkhead 68 and the feeding portion 71 is prevented by absorbing deformation of the extension portion 73 lifted by the pressing in height of the portion of the peripheral wall section 66 having no connecting wing. The extension portion 73 is formed simultaneously with the developed bulkhead 68 by the preceding punching process (I). This proves that deformation of the extension portion 73 is not caused by difference of property of materials since the material of the extension portion 73 and that of the partition face 61 are identical. As a result, the extension portion 73 allows the structural deformation by adopting the pantagraph structure having the closed ring shape. The prior art therefore requires the extension portion 73 which cannot be reflected as the product. Thus, the prior art has a problem that a large amount of material including the extension portion 73 becomes waste.

As shown in FIG. 3, the semi-finished bulkhead 18 completed forming of individual portions is separated from the feeding portion 51 in a separating process (III), and the bulkhead 1, as shown in FIG. 1, is completed as a product by removing the remainder of the joint portion 53. The feeding portion 51 is cut in the feeding direction into small pieces of a waste 54 so as to separate the bulkhead 1 conveniently. It is apparent that the waste 54 of the feeding portion 51 is smaller than a waste 74 of the prior art (refer to the separating processes (III) shown in FIG. 4 and FIG. 6).

The separation of the bulkhead 1 from the joint portion 53 in the separating process (III) is executed in cutting the joint portion 53 off the bulkhead 1 by shearing with a cutting edge 521 which is one edge of the lower mold 52 and the cutting edge 523 of the upper mold. This operation is also applied to the case of the prior art, in which the bulkhead 6 and the extension portion 73 are to be separated. In the conventional case, as shown in FIG. 6, a thin cutting edge 721 has to be so projected upwardly from a lower mold body 722 along the portion of the peripheral wall section 66, to which the extension portion 73 is jointed, that the cutting edge 721 and the cutting edge 723 of the upper mold are intersected each other. In the present invention, on the contrary, the cutting edge 521 for cutting the bulkhead 1 and the joint portion 53 off each other need not be projected, as shown in FIG. 4, but the cutting edge 521 can be coplanar with a lower mold body 522 thereby to prevent the lower mold 52 from being partially broken. Thus, it is the effect of the invention on the manufacture that an amount of the waste can be reduced to prevent the metal mold, especially the lower mold, from being partially broken.

Additionally, the present invention can provide with further advantage that is obtained from the difference in the denting direction of the bead 14 formed on the partition face 11. It can be conceived, for example, that a bead denting toward the opposite direction of the present invention defined as the folded direction of the connecting wings. In this case, however, to form the bead having the same height throughout the both folded edges 131, 131 makes the material steel sheet partially stretching greatly, and thereby to make thickness of the material steel sheet extremely thinner or to cause cracking. On the other hand, if the bead were shaped to give no strain on the forming, it would not reach to the folded edges 131, 131 while lowering its heights. As a result, the bead in this case cannot perform as a tension element to the both side faces of the main part. According to the present invention, the problems described above can be solved so that the bead 14 denting in the folded direction of the connecting wings 12, 13, 13 is formed as a ridge on the partition face 11. The bead 14 in the present invention, thus, can perform not only as a reinforcement of the folded edges 131, 131 and the partition face 11, but also as a tension element between the both side faces 211, 211 of the main part 21. The present invention, therefore, provides the bulkhead 1 as an effective reinforcement member to the main part 21 of the vehicular frame member.

What is claimed is:

1. A bulkhead for raising strength and rigidity of a vehicular frame member, which is an upright partition separating compartments of the vehicular frame member having a channel-shaped section, comprising:

a partition face having an outer shape contoured to a sectional shape of the vehicular frame member;

a plurality of connecting wings projected integrally from individual sides of the partition face except one side defined as an open edge, folded in the same direction at the individual sides, and including a peripheral wall section having a C-shape formed by linking vicinities of folded edges that are adjacent to each other; and a bead formed on the partition face near the open edge in that it is denting in same direction of the connecting wings that are folded, and extending in parallel to the open edge through the opposed folded edges of the connecting wings.

2. The bulkhead according to claim 1, wherein the partition face includes a swelling bed part swelling in the opposite direction of the folding direction of the connecting wings.

3. The bulkhead according to claim 1, wherein the bead has a semicircular section in a diameter of about 6 mm to 10 mm.

* * * * *